Oct. 4, 1966    A. A. KALINSKE    3,276,585
FILTRATION PROCESS
Original Filed Oct. 8, 1962
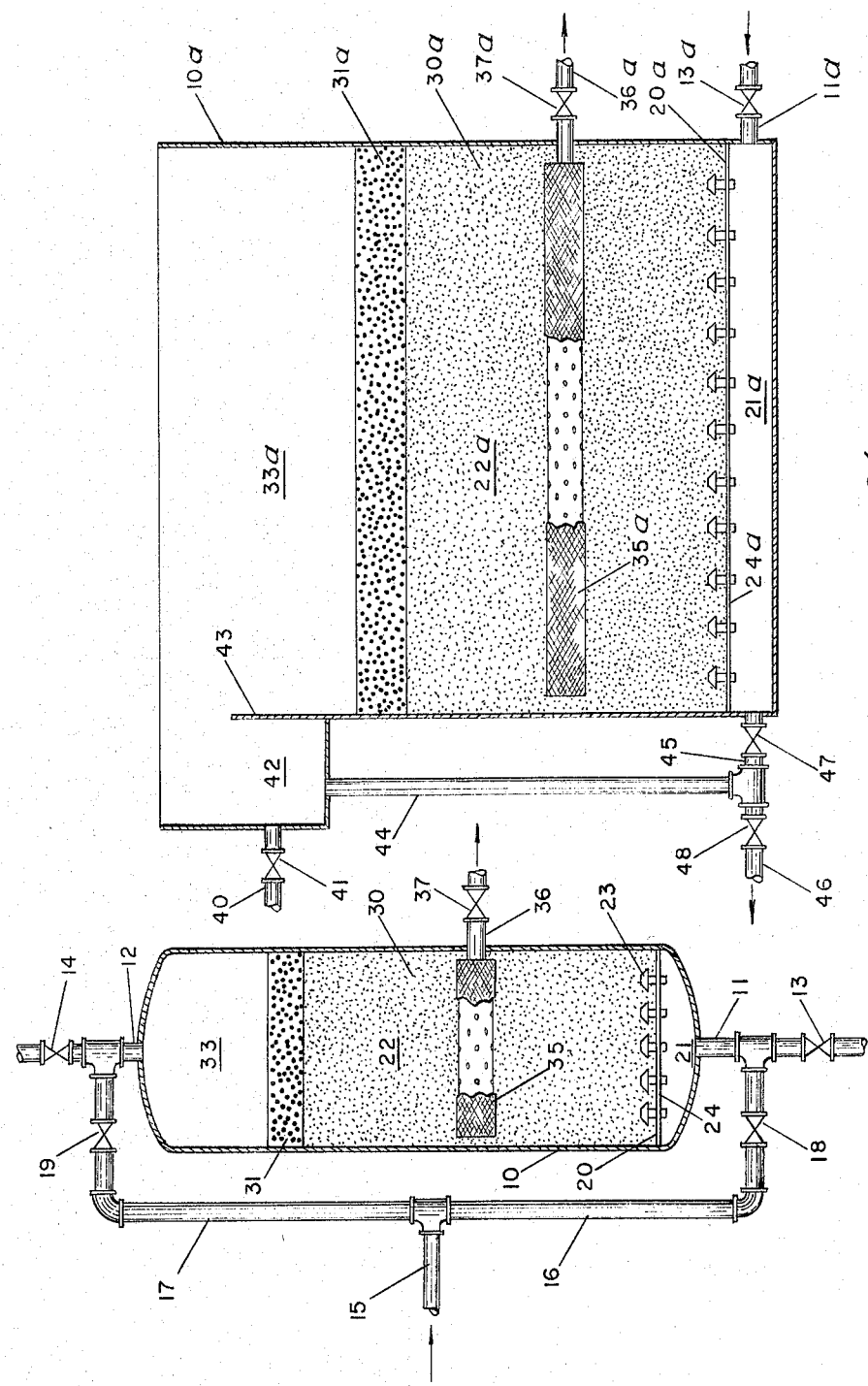

3,276,585
FILTRATION PROCESS
Anton A. Kalinske, Salt Lake City, Utah, assignor to Fuller Company, Catasauqua, Pa., a corporation of Delaware
Continuation of application Ser. No. 229,099, Oct. 8, 1962. This application Oct. 22, 1965, Ser. No. 516,813
3 Claims. (Cl. 210—80)

This is a continuation of application Serial No. 229,099, filed October 8, 1962, now abandoned.

This invention relates to filters using a particulate material, such as sand, coal and the like, as filter medium, and specifically to a filtration process which takes place by simultaneous upward and downward flow through the filter medium, with the filtered water being collected by a collection system embedded in the filter medium at a suitable elevation.

It is an object of the invention to provide an improved filtration process.

Another object is to provide filtration process wherein suspended solids are removed by distributing them throughout the filter bed, so as to permit handling a larger amount of solids before the filter bed becomes clogged and must be washed.

Another object of the invention is a filtration process in which the potential advantages of simultaneous upward and downward filtration can be fully realized.

Another object is to provide a filtration process in which premature clogging of the upper filter portion relative to the lower portion is prevented, whereby filtering in downward direction takes place during a filter run for substantially the same length of time as in the upward direction.

Other objects will become apparent from the detailed description and the claims which follow.

It has been recognized in recent years that in order to obtain long filter runs, the suspended solids removed by the filter should be distributed throughout the filter bed. Upward filtration through the usual graded bed of sand of upwardly decreasing effective particle size has been found more suitable for distributing the solids through the entire bed than the more generally practiced downward filtration. However, upward filtration has the drawbacks that the filtration rate must be relatively low to avoid expansion of the bed and carry-over of filter medium during filtration and that the liquid tends to channel through the bed directly to the filtered liquid outlet, so that the filter medium is no uniformly utilized.

By applying liquid to be filtered both to the bottom and the top of the filter bed, these drawbacks are overcome. The liquid pumped to the top of the filter bed exerts downward pressure on, and compacts the bed during filtration, thereby counteracting the upward pressure of the liquid entering at the bottom, which tends to expand the bed, and also overcoming the tendency of the upflowing liquid to break through the bed and form direct channels to the filtered water collection system. The liquid flowing from the free-board space of the filter to the filtered liquid collection system passes through a layer of fine filter material. If this layer is of sufficient depth to effectively filter the liquid, there is the additional advantage that a larger quantity of liquid can be filtered by the same quantity of filter material than by upflow filtration alone.

In practice, however, even with a sufficiently deep layer of fine filter material above the filtered liquid collector, the filtering of the downflowing liquid is quite limited in time, due to the fact that the impurities contained in the raw liquid very rapidly clog the fine sand at the top of the filter bed and form a layer of dirt or "Schmutzdecke" on the bed surface. Thereafter downward filtration ceases and the liquid at the top of the filter bed serves only to counteract the pressure of the upflowing liquid, until the lower portion of the bed requires cleaning, at which time the entire bed is backwashed and the dirt layer removed. Under these circumstances the distribution of solids in the portion of the filter above the filtered liquid withdrawal system does not penetrate substantially beyond the top layer of the filter bed. Thus the potential advantages of simultaneous upward and downward filtration are only partially realized.

I have found that this serious limitation on the benefits obtainable from simultaneous upward and downward filtration can be overcome by providing above the top layer of fine filter medium a layer of lighter material having a larger particle size, such as, for example, coal or a suitable synthetic material. This layer with its larger interstices effects uniform distribution of the downflowing water and is not subject to the rapid clogging and formation of a "Schmutzdecke" occurring with fine sand. Thus downward filtration continues substantially for the same time as upward filtration, and the solids removed from the liquid are very evenly distributed throughout the entire filter bed, resulting in larger amounts of solids removed before the filter becomes clogged.

The invention will be more readily understood by reference to the drawing, wherein similar elements in the several figures are designated by similar reference characters.

FIGURE 1 is a diagrammatic view in vertical cross section of a pressure filter according to the invention; and FIGURE 2 is a diagrammatic view in vertical cross section of a gravity filter according to the invention.

The pressure filter shown in FIGURE 1 comprises a closed casing or tank 10 provided with a conduit 11 connected to its bottom and a conduit 12 connected to its top. Conduits 11 and 12 are fitted with valves 13 and 14, respectively. An inlet conduit 15 for liquid to be filtered divides into branch conduit 16 leading to conduit 11, and a second branch conduit 17 leading to conduit 12. Branch conduits 16 and 17 are provided with valves 18 and 19, respectively.

A filter bed support and liquid distribution or underdrain system 20 is provided in the lower portion of the filter and separates an inlet chamber 21 from a filter chamber 22. The distribution system 20 may be simply a plate with suitable perforations extending across the lower portion of the tank, or any other underdrain system capable of uniformly distributing the raw liquid across the filter chamber 22 and of supporting the filter bed can be used. For purposes of illustration a system is shown comprising a plurality of nozzles 23 extending through an otherwise solid plate 24.

The filter bed 30 may be supported directly on plate 24, if the nozzles are shielded against ingress of sand by a screening or other protective device, or on a supporting layer of fine gravel, not shown, resting on the plate 24.

The filter bed 30 is uniformly graded, about 4' to 5' deep, of a material of, say, means effective size of .55–1.0 mm. On top of the bed 30 is a layer 31 of a lighter material having a larger particle size, say, of a means effective size of 1.25–1.50 mm. Sand is preferred for the uniformly graded bed 30 and coal may be used therewith as the lighter material of larger particle size. It will be understood, however, that other materials of suitable weight and particle size can be selected, such as coal for the bed 30, and a lighter plastic for the layer 31.

The tank 10 must be of sufficient depth to accommodate the bed 30 and layer 31, the inlet chamber 21 and a freeboard space 33 permitting expansion of the bed during washing.

Midway in the bed 30 is a porous filtered liquid collector 35. A filtered liquid outlet conduit 36, provided with a valve 37, leads from collector 35 to outside the tank. The collector 35 preferably is screened to prevent entrainment of sand into and through its pores.

During the filtering run the liquid arrives under suitable pressure through conduit 15 and divides about equally between branch conduits 16 and 17. The liquid entering at the bottom of the filter through conduit 11 and inlet chamber 21 is distributed uniformly by the nozzles 23 or other distributing means provided and rises through the lower half of bed 30 to the filtered liquid collector 35 from which it is withdrawn through conduit 36. Any further rise of the upflowing liquid is opposed by the downflow of the liquid entering the filter through conduit 12 and flowing down through freeboard space 33, coal layer 31 and the upper half of the sand bed 30 to the filtered liquid collector 35.

The layer 31 of coal or other material of suitable weight and particle size relative to the sand in bed 30, performs essentially the same function as the distributing nozzles 23 at the bottom of the sand bed. It also strains out larger solids contained in the liquid which otherwise would clog the sand bed rapidly but which do not clog the larger interstices in the layer 31, and prevents formation of a dirt layer on its top. The downward filtration, therefore, continues for substantially the same period of time as the upward filtration and all parts of the filter bed are utilized uniformly to retain solids.

When the filter requires cleaning, valves 18 and 19 on branch inlet conduits 16 and 17 and valve 37 on filtered liquid outlet conduit 36 are closed. Valves 13 and 14 are opened to admit wash fluid from a suitable source, not shown, through conduit 11 and withdraw it through conduit 12. Preferably an air-liquid wash is used to accomplish complete cleaning of the filter bed without resorting to excessive expansion or fluidization of the bed; but a liquid wash alone can be used under favorable circumstances. During the filter wash the lighter particles of layer 31 are not mixed with the heavier particles of the bed but remain above the expanded sand bed, and then the wash operation is completed and the bed of fine heavier material compacts, the lighter particles settle on top of the bed.

The gravity filter of FIGURE 2 is similar in construction and operation to the pressure filter of FIGURE 1. The open tank 10a has across its lower portion an underdrain or distribution system 20a which may be of similar construction as underdrain system 20. The underdrain 20a forms in the tank 10a an inlet chamber 21a and a filter chamber 22a. The plate 24a of the underdrain 20a supports a uniformly graded bed 30a of sand or other material of a suitable mean effective particle size, as described in connection with FIGURE 1, and a layer 31a of coal or other suitable material which is lighter and of larger mean effective size is arranged on top of the sand bed. A porous filtered liquid collector 35a extends midway in the bed and a filtered liquid outlet conduit 36a, provided with a valve 37a, leads therefrom to outside the tank.

The liquid to be filtered arrives through an inlet conduit 40, provided with a valve 41, and enters a flume 42 provided with an overflow edge 43. A conduit 44 leads from the bottom of the flume 42 and divides into a branch conduit 45 discharging to the inlet chamber 21a, and a wash water outlet or waste conduit 46. Branch conduits 45 and 46 are fitted with valves 47 and 48, respectively. A wash fluid inlet conduit 11a, provided with a valve 13a, discharges to the inlet chamber 21a.

During filtering valves 41, 47, and 37a are open and valves 13a and 48 are closed. About equal portions of liquid to be filtered enter the inlet chamber 21a through conduits 44 and 45, and through the freeboard space 33a by flowing over the edge 43 of flume 42, and filter upward and downward, respectively, through the bed to the filtered water collector 35a. When the bed requires cleaning, valves 41, 47 and 37a are closed and valves 13a and 48 opened.

Wash fluid now enters the inlet chamber 21a through conduit 11a and flows upward through the filter bed 30a and layer 31a, expanding them and washing out the filtered out impurities. The dirty wash liquid flows over edge 43 into flume 42 and through conduits 44 and 46 to waste.

This embodiment of the invention has the same advantages as described in connection with the pressure filter of FIGURE 1.

Comparative tests of the performance of a conventional filter of the type wherein the liquid to be filtered is introduced simultaneously at the bottom and at the top, and of a filter according to the invention were made. The following test data indicate the benefits obtained by modifying the conventional filter so as to obtain upward and downward filtration throughout the entire filter run by use of a layer of particulate material of larger particle size and lighter weight than the filter bed material, thus preventing clogging of the top of the filter bed and formation of a Schmutzdecke.

In these tests the filter rate was maintained at 10 g.p.m./ft.$^2$. The water entering the filters had a suspension of about 15 mg./l. of alum floc.

The conventional filter ran for about 20 hours and the head loss built up to about 14 ft. The effluent turbidity started out at 2 mg./l. and rose to 8 mg./l. toward the end of the run. This indicates that the filtration rate was too high for the amount of suspended solids entering the filter.

The improved filter according to the invention had a 28 hour run and the head loss built up to about 25 ft. The effluent turbidity started out at 0.6 mg./l. and rose to 3.3 mg./l. at the end of the run.

It is thus apparent that the same body of filter media is used more efficiently in a filter according to the invention, with the result that a better quality effluent and longer filter runs are obtained.

I claim:

1. A method of continuously filtering a liquid through a filter bed of particulate material to remove suspended solids contained in said liquid comprising:
dividing the flow of liquid to be filtered into substantially equal first and second portions,
filtering said first portion of liquid upwardly through the lower part of said filter bed to a common filtered liquid collector embedded substantially midway in said filter bed,
simultaneously distributing said second portion of liquid across the upper surface of said filter bed whereby the larger suspended solids in said liquid are removed,
filtering the liquid downwardly through the filter bed to said common liquid collector,
collecting both the upwardly and downwardly filtered liquid in said common filtered liquid collector, and
withdrawing the filtered liquid from the common filtered liquid collector.

2. A method of continuously filtering a liquid through a filter bed to remove suspended solids contained in said liquid which comprises:
filtering a first portion of the liquid upwardly through the lower part of said filter bed to a common liquid collector located substantially midway in said filter bed,
simultaneously passing a second portion of said liquid substantially equal to said first portion downwardly through a layer of material supported on said filter bed, said layer being of a particulate material having larger particle size than the filter bed media, whereby the liquid is distributed throughout the underlying filter bed and the larger solids contained in the liquid are removed, thereafter filtering the downwardly flowing liquid through the filter bed to said common filtered liquid collector, and collecting and removing the upwardly and downwardly filtered liquid through the common filtered liquid collector.

3. The method of claim 2 wherein the filter is backwashed when it becomes clogged by discontinuing the flow of liquid to be filtered, discontinuing the flow from the common filtered liquid collector, admitting wash water from beneath the filter bed to expand the bed in such a manner that the filter bed and the upper layer of larger particulate material are not intermixed, withdrawing the wash water, and continuing operation until the filter bed is clean.

References Cited by the Examiner

UNITED STATES PATENTS 2,723,761  11/1955  Van der Mode et al.
                                                        210—290 X REUBEN FRIEDMAN, *Primary Examiner.*

SAMIH ZAHARNA, *Examiner.*